(12) United States Patent
McGorrin

(10) Patent No.: US 8,007,548 B2
(45) Date of Patent: Aug. 30, 2011

(54) PRETREATMENT FLUID AND METHOD OF MAKING AND USING THE SAME

(75) Inventor: Marlene Ann McGorrin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 967 days.

(21) Appl. No.: 11/741,940

(22) Filed: Apr. 30, 2007

(65) Prior Publication Data

US 2008/0266349 A1 Oct. 30, 2008

(51) Int. Cl.
| | |
|---|---|
| *C09B 67/00* | (2006.01) |
| *B41J 2/015* | (2006.01) |
| *C04B 28/36* | (2006.01) |
| *B01D 46/10* | (2006.01) |
| *B05D 3/00* | (2006.01) |

(52) U.S. Cl. ............. 8/552; 8/550; 347/21; 106/287.23; 106/287.27; 427/444

(58) Field of Classification Search .............. 8/552, 550; 347/21; 106/287.23, 287.27; 427/444
See application file for complete search history.

(56) References Cited

U.S. PATENT DOCUMENTS

| | | |
|---|---|---|
| 4,311,618 A | 1/1982 | Schäfer-Burkhard |
| 4,947,187 A | 8/1990 | Iwagami |
| 5,500,659 A | 3/1996 | Curran, Jr. et al. |
| 5,534,897 A | 7/1996 | Anderson et al. |
| 5,793,390 A | 8/1998 | Claflin et al. |
| 6,176,563 B1 | 1/2001 | Anderson et al. |
| 6,293,648 B1 | 9/2001 | Anderson |
| 6,511,155 B1 | 1/2003 | Fassler et al. |
| 6,630,017 B2 | 10/2003 | Ma et al. |
| 6,673,140 B2 * | 1/2004 | Tyrell et al. .................. 106/31.5 |
| 6,752,493 B2 | 6/2004 | Dowell et al. |
| 7,090,344 B2 | 8/2006 | Shinada et al. |
| 2003/0196569 A1 * | 10/2003 | Yatake et al. ............... 106/31.58 |
| 2008/0265211 A1 * | 10/2008 | Rehman et al. ............... 252/364 |

FOREIGN PATENT DOCUMENTS

| | | | |
|---|---|---|---|
| WO | WO 2006030930 | * | 3/2006 |
| WO | WO 2007044110 | * | 4/2007 |
| WO | WO 2007072951 A1 * | | 6/2007 |

OTHER PUBLICATIONS

Air Products. Surfynol 104 Surfactant. 2001. p. 2.*
Polyfox www.omnova.com Jan. 2007 pp. 1-2.*

* cited by examiner

*Primary Examiner* — Lorna M Douyon
*Assistant Examiner* — Tanisha Diggs

(57) ABSTRACT

A pretreatment fluid includes an effective amount of a fluorinated surfactant and a vehicle. The fluorinated surfactant is selected from at least one non-ionic fluorinated surfactant, at least one ionic fluorinated surfactant, and combinations thereof. The effective amount is selected based upon: a system in which the pretreatment fluid is used, an ink composition used in the system, system pretreatment time, pretreatment vehicle components, or combinations thereof.

19 Claims, No Drawings

PRETREATMENT FLUID AND METHOD OF MAKING AND USING THE SAME

BACKGROUND

The present disclosure relates generally to a pretreatment fluid, and to methods of making and using the same.

Inkjet printing is a non-impact printing method where droplets of ink are deposited on a print media, such as paper, to form a desired image. Inkjet printers and other fluid ejection devices incorporating similar technology may, in some instances, experience occasional problems with performance and/or reliability. Such problems may include, be a result of, or occur in conjunction with, printing startup, print frequency response, ease of nozzle priming, nozzle recovery after storage, ink starvation or trapped air during printing, or the like, or combinations thereof. In an attempt to alleviate one or more of these potential problems, additives have been included in the fluids (e.g., inkjet inks) that are ejected from such devices. However, desirable additive types and amounts may be limited by regulations and/or additives may deleteriously affect the performance of fluid jettability and/or the performance of the fluid on media. Such deleterious effects on inkjet ink performance include, but are not limited to reduced decap times, decreased nozzle recovery, decreased nozzle startup, increased puddling, lower ink cloud point, decreased frequency response, increased viscosity, bleed, wicking, media penetration, lower color saturation, etc.

DETAILED DESCRIPTION

Embodiments of the pretreatment fluid disclosed herein are advantageously suitable for pretreating printer pens and other fluid ejection device components and fluid delivery systems. The pretreatment fluid is formulated with an effective amount of ionic and/or non-ionic fluorinated surfactants, and is exposed to fluidic component(s) for a predetermined time. The formulation and exposure time are configured such that the surfactants are able to migrate and adsorb to exposed surfaces of the fluidic components. It is believed that the pretreatment fluid preconditions the surfaces, and improves printer performance and reliability of fluids introduced after pretreatment. Further, it is believed that specific amounts and/or combinations of ionic and non-ionic fluorinated surfactants may be selected to produce lasting effects over relatively long periods of time and after exposure to relatively high volumes of subsequently introduced fluids. As such, the pretreatment fluid may enhance the stability, reliability, and/or print quality of an inkjet ink printed on a medium.

Without being bound to any theory, it is believed that the components of the pretreatment fluid are interactive, and as such, the effective amount of the fluorinated surfactants depends, at least in part, on the system in which the pretreatment fluid is used, the ink composition that is used in the system, the system pretreatment time, the pretreatment fluid vehicle components, and/or combinations thereof. The phrase "effective amount," as used herein, refers to the minimal amount of a substance and/or agent, which is sufficient to achieve a desired and/or required effect. For example, an effective amount of a vehicle is the minimum amount required in order to create a pretreatment fluid composition, while maintaining properties suitable for pretreating a surface.

Fluidic components that may be pretreated using embodiments of the pretreatment fluid disclosed herein include those elements or parts in thermal or piezoelectric printers that contact or contain fluids. Non-limiting examples of such components include printer pen surfaces, orifice plate surfaces, nozzles, bores, dies, firing chambers, resistors, ink feed channels, particle tolerant architecture (PTA) features or shelves, slot surfaces, plenum surfaces, filters, screens, ink delivery system (IDS), and/or the like, and/or combinations thereof.

In an embodiment, the pretreatment fluid includes a vehicle and at least one fluorinated surfactant. One or more ionic fluorinated surfactants, one or more non-ionic fluorinated surfactants, or combinations of ionic and non-ionic fluorinated surfactants may be used in the pretreatment fluid. The method of forming the pretreatment fluid generally includes determining an effective amount of fluorinated surfactant, and then adding a vehicle to the surfactant(s), or adding the surfactant(s) to the vehicle.

The vehicle may be a single solvent, a combination of co-solvents, or a combination of one or more solvents and other additives. In one embodiment, the vehicle is water. In another embodiment, the vehicle includes a combination of water and water-soluble organic co-solvents. Non-limiting examples of such co-solvents include propylene glycol, 2-methyl-1,3-propanediol, 2-pyrrolidinone, diethylene glycol (DEG), 1,6-hexanediol, 1,5-pentanediol, 2-ethyl-(2-hydroxymethyl)-1,3-propanediol, 1,2-(hydroxylethyl)-2-pyrrolidinone, trimethylolpropane (EHPD), tetraethylene glycol, and/or combinations thereof.

Other suitable co-solvents for the vehicle include, but are not limited to aliphatic alcohols, aromatic alcohols, diols, glycol ethers, poly(glycol) ethers, N-alkyl caprolactams, unsubstituted caprolactams, both substituted and unsubstituted formamides, both substituted and unsubstituted acetamides, long chain alcohols, ethylene glycol, propylene glycol, diethylene glycols, triethylene glycols, glycerin, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, ketones, and/or combinations thereof. As non-limiting examples, co-solvents may include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, 1,6-diols of 30 carbons or less, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, and/or the like, and/or combinations thereof.

In non-limiting examples of the vehicle including co-solvents and water, the amount of co-solvent(s) ranges from about 1 wt % to about 95 wt %, from about 5 wt % to about 50 wt %, or from about 10 wt % to about 30 wt %.

Embodiments of the pretreatment fluid may include various types of additives. It is to be understood that one or more of the additives may be included, at least in part, to optimize the performance of the pretreatment fluid and/or the performance of fluids introduced subsequent to pretreatment. Non-limiting examples of such pretreatment fluid additives include non-fluorinated surfactants, biocides, humectants, anti-kogation additives, anti-corrosive additives, polymers, preservatives, chelating agents or sequestering agents (e.g., EDTA, to substantially eliminate deleterious effects due to heavy metal impurities), organic solutes, inorganic solutes, preservatives, salts, colorants (e.g., dyes, pigments, or combinations thereof), buffers (e.g., TRIZMA® base, commercially available from Sigma-Aldrich Corp. (Milwaukee, Wis.), to maintain a desired pH), 4-morpholine ethane sulfonic acid (MES), 4-morpholinepropanesulfonic acid (MOPS), beta-hydroxy-4-morpholinepropane-sulfonic acid (MOPSO), acids, bases, viscosity modifiers, anti-flocculants (e.g., to improve anti-flocculant performance of colorant(s) present either in the pretreatment fluid or in the subsequent fluid), and/or combinations thereof. An example of an antiflocculant includes, but is not limited to a phenylenediamine compound having the following structure:

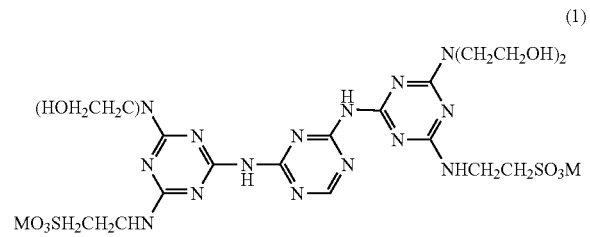

(1)

Formula (1) may be a salt, where M is a monovalent cation (non-limiting examples of which include lithium or sodium).

It is to be understood that any suitable combination of the previously listed solvents, co-solvents, and additives may be used in the vehicle in order to achieve the desired effect on performance of the pretreatment fluid and/or performance of the subsequent fluids for specific applications. One or more of the additives disclosed herein (e.g., non-fluorinated surfactants) may modulate the activity of the fluorinated surfactants on a fluidic component; as such, it is to be understood that such additives (and amounts thereof) are selected to achieve a desired effect.

Non-limiting examples of non-fluorinated surfactant additives suitable for use in the pretreatment fluid vehicle include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and/or combinations thereof.

Specific examples of such non-fluorinated surfactants include but are not limited to non-ionic and amphoteric surfactants including TERGITOL® compounds, which are alkyl polyethylene oxides available from Dow Chemical (Midland, Mich.); TRITON® compounds, which are alkyl phenyl polyethylene oxide surfactants available from Rohm & Haas Co. (Philadelphia, Pa.); BRIJ® compounds available from ICI Americas (Wilmington, Del.); PLURONIC compounds, which are polyethylene oxide/polypropylene oxide block copolymers available from BASF Corp. (Florham Park, N.J.); SURFYNOL® compounds (e.g., SURFYNOL®465), which are hydrophilic-hydrophobic modified acetylenic diols available from Air Products (Allentown, Pa.); anionic surfactants such as members of the DOWFAX® family of diphenyl sulfonate derivatives available from the Dow Chemical Company, and the CRODAFOS™ family of phosphate esters available from Croda Incorporated; polyethylene oxide ("POE") esters; POE diesters; POE amines; POE amides; dimethicone copolyols; and/or combinations thereof. Generally, the SURFYNOL® family of non-fluorinated surfactants have the following structure:

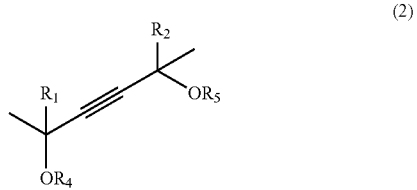

(2)

where $R_1$ and $R_2$ are branched alkyl groups, and $R_4$ and $R_5$ are modified hydrophilic-hydrophobic groups, or H.

The biocides may be added to the pretreatment fluid, at least in part, to inhibit the growth of undesirable microorganisms. Examples of such biocides include, but are not limited to benzoate salts, sorbate salts, various commercially available biocides (such as PROXEL® GXL available from Avecia Inc., Wilmington, Del.), and/or combinations thereof. Generally, the biocide is present in an amount ranging from about 0.01 wt % to about 2 wt %.

As indicated hereinabove, some embodiments of the pretreatment fluid also include colorants (e.g., pigment and/or dye). It is to be understood that the colorants disclosed herein may be employed in embodiment(s) of the pretreatment fluid and/or in embodiment(s) of a subsequent fluid (e.g., ink contacting pretreated surfaces).

It is to be understood that any suitable dye may be selected. Various ink-jet ink dyes may be used, including any suitable cationic dye or anionic dye. One example anionic dye is a chromophore having a pendent anionic group. While it is to be understood that any effective amount of dye may be used, in one embodiment, the anionic dye is present in the pretreatment fluid composition in an amount ranging from about 0.1 wt % to about 1 wt %, or in the subsequent fluid composition in an amount ranging from about 0.1 wt % to about 10 wt %.

Other examples of suitable anionic dyes that may be used include, but are not limited to water-soluble acid and direct dyes. Specific non-limiting examples of anionic dyes include: Direct Yellow 86, Direct Yellow 132, Acid Red 249, Direct Blue 199, Direct Black 168, Reactive Black 31, Direct Yellow 157, Reactive Yellow 37, Acid Yellow 23, Reactive Red 180, Acid Red 52, Acid Blue 9, Direct Red 227, Acid Yellow 17, Direct Blue 86, Reactive Red 4, Reactive Red 56, Reactive Red 31, Direct Yellow 132, AMINYL® Brilliant Red F-B (Sumitomo Chemical Co.), the DUASYN® line of "salt-free" dyes available from Hoechst, and/or the like, and/or combinations thereof. Further examples of suitable dyes include Bernacid Red 2BMN, PONTAMINE® Brilliant Bond Blue A (Lanxess Corp., Pittsburgh, Pa.), BASF X-34, PONTAMINE® (Lanxess Corp.), Food Black 2, LEVAFIX® Brilliant Red E -4B (Mobay Chemical, Pittsburgh, Pa.), LEVAFIX® Brilliant Red E-6BA (Mobay Chemical), Pylam Certified D&C Red #28 (Acid Red 92, Pylam), Direct Brill Pink B Ground Crude (Crompton & Knowles), CARTASOL® Yellow GTF Presscake (Sandoz, Inc.), Tartrazine Extra Conc. (FD&C Yellow #5, Acid Yellow 23, Sandoz, Inc.), CARTASOL® Yellow GTF Liquid Special 110 (Sandoz, Inc.), D&C Yellow #10 (Yellow 3, Tricon), Yellow Shade 16948 (Tricon), Basacid Black X34 (BASF), Carta Black 2GT (Sandoz, Inc.), NEOZAPON® Red 492 (BASF), ORASOL® Red G (Ciba-Geigy), Direct Brilliant Pink B (Crompton-Knolls), Aizen Spilon Red C-BH (Hodagaya Chemical Company), Kayanol Red 3BL (Nippon Kayaku Company), LEVANOL® Brilliant Red 3BW (Mobay Chemical Company), LEVADERM® Lemon Yellow (Mobay Chemical Company), Aizen Spilon Yellow C-GNH (Hodagaya Chemical Company), Spirit Fast Yellow 3G, Sirius Supra Yellow GD 167, CARTASOL® Brilliant Yellow 4GF (Sandoz), PERGASOL® Yellow CGP (Ciba-Geigy), ORASOL® Black RL (Ciba-Geigy), ORASOL® Black RLP (Ciba-Geigy), SAVINYL® Black RLS (Sandoz), Dermacarbon 2GT (Sandoz), PYRAZOL® Black BG (ICI Americas), MORFAST® Black Conc A (Morton-Thiokol), DIAZOL® Black RN Quad (ICI Americas), ORASOL® Blue GN (Ciba-Geigy), SAVINYL® Blue GLS (Sandoz, Inc.), LUXOL® Blue MBSN (Morton-Thiokol), SEVRON® Blue 5GMF (ICI Americas), BASACID® Blue 750 (BASF); LEVAFIX® Brilliant Yellow E-GA, LEVAFIX® Yellow E2RA, LEVAFIX® Black EB, LEVAFIX® Black E-2G, LEVAFIX® Black P-36A, LEVAFIX® Black PN-L, LEVAFIX® Brilliant Red E6BA, and LEVAFIX® Brilliant Blue EFFA, all commercially available from Bayer; PROCION® Turquoise PA, PROCION® Turquoise HA, PROCION® Turquoise Ho5G, PROCION® Turquoise H-7G, PROCION® Red MX-5B, PROCION® Red MX 8B GNS, PROCION® Red G, PROCION® Yellow MX-8G, PROCION® Black H-EXL, PROCION® Black P-N, PROCION® Blue MX-R, PROCION® Blue MX-4GD, PROCION® Blue MX-G, and PROCION® Blue MX-2GN, all commercially available from ICI Americas; Cibacron Red F-B, Cibacron Black BG, LANASOL® Black B, LANASOL® Red 5B, LANASOL® Red B, and LANASOL® Yellow 46, all commercially available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E-6B, all commercially available from BASF; SUMIFIX® Turquoise Blue G, SUMIFIX® Turquoise Blue H-GF, SUMIFIX® Black B, SUMIFIX® Black H-BG, SUMIFIX® Yellow 2GC, SUMIFIX® Supra Scarlet 2GF, and SUMIFIX® Brilliant Red 5BF, all commercially available from Sumitomo Chemical Company; INTRACRON® Yellow C-8G, INTRACRON® Red C-8B, INTRACRON® Turquoise Blue GE, INTRACRON® Turquoise HA, and INTRACRON® Black RL, all commercially available from Crompton and Knowles, Dyes and Chemicals Division; ProJet 485 (a copper phthalocyanine); Magenta 377; Yellow 1189; and/or the like, and/or combinations thereof.

It is to be understood that the previously listed dyes are merely illustrative, and should not be considered to be limiting. Furthermore, a large range of cationic dyes may also be used. Alternatively, any other suitable dye and/or pigment may be employed in embodiments of pretreatment fluids or subsequent fluids.

In one non-limiting example, the pretreatment fluid is configured to optimize the performance of a subsequent ink containing magenta colorant that is suitable for use in ink-jet printing. The magenta colorants in this particular ink include magenta dyes having the following structures:

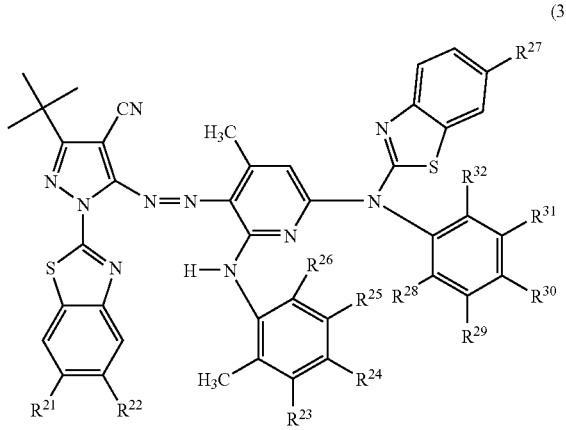

(3)

-continued

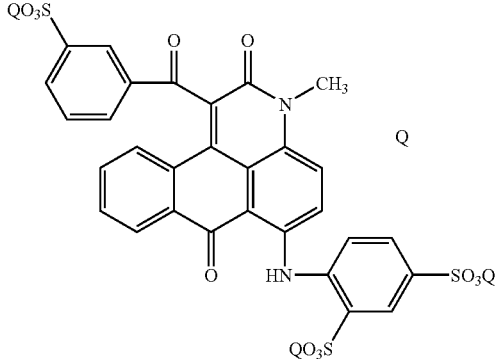

(4)

The magenta dye shown in Structure 3 includes: $R^{21}$, $R^{23}$, $R^{25}$, $R^{27}$, $R^{29}$, and $R^{31}$, which are independently selected from a hydrogen atom or a sulfonate group; $R^{22}$, which is selected from a hydrogen atom or a nitro group; $R^{26}$ and $R^{28}$, which are independently selected from a hydrogen atom or a methyl group; $R^{24}$ and $R^{30}$, which are independently selected from a methyl or sulfonate group; and $R^{32}$, which is selected from a methyl or a methoxy group. In one embodiment, Structure 3 is as follows: $R^{21}$, $R^{23}$, $R^{27}$, and $R^{31}$ are sulfonate groups; $R^{22}$, $R^{25}$, and $R^{29}$ are hydrogen atoms; and $R^{24}$, $R^{26}$, $R^{28}$, $R^{30}$, and $R^{32}$ are methyl groups. The sulfonate group may be a salt of lithium, sodium, potassium, ammonium, tetramethylammonium, or combinations thereof.

The magenta dye shown in Structure 4 includes Q, which is selected from lithium, potassium, sodium, ammonium, tetramethylammonium, or combinations thereof. Structure 4 is shown in its acid form; however, it is to be understood that Structure 4 may be in its salt form, including, but not limited to a salt of sodium or ammonium. In addition to these two types of dyes, other magenta and non-magenta dyes may also be included in the magenta ink-jet ink.

In another non-limiting example, the pretreatment fluid is configured to optimize the performance of a subsequent ink containing two magenta dyes (e.g., those shown in Structures 3 and 4), and a cyan colorant. The cyan colorant may be a dye having the following structure:

(5)

Structure 5 includes: M, which is selected from a hydrogen atom or a metal atom (or an oxide, hydroxide, or halide thereof); $P_c$, which is a phthalocyanine nucleus; $R^1$ and $R^2$, which are substituents selected from $-SOX^1$, $-SO_2X^1$, $SO_2NX^2X^3$, $-SO_3X^4$, where $X^1$, $X^2$, $X^3$, and $X^4$ are each independently selected from a hydrogen atom, a substituted or unsubstituted alkyl group, a substituted or unsubstituted aryl group, or a substituted or unsubstituted heterocyclic group. In an embodiment, $R^1$ and/or $R^2$ has an ionic hydrophilic group as a substituent. In another embodiment, $R^1$ may be $-SO-(CH_2)_3-SO_3Z$ or $-SO_2-(CH_2)_3-SO_3Z$; and/or $R^2$ may be $-SO_2-(CH_2)_3-SO_2NH-C_2H_4OC_2H_4OH$ or $-SO_2-(CH_2)_3-SO_2NH-CH_2CH(OH)CH_3$. In these embodiments, Z is lithium, sodium, potassium, ammonium, tetramethylammonium, or combinations thereof. In a non-limiting example, Z is lithium or potassium. Additionally, Structure 5 includes k and l, which are each selected from an integer ranging from 1 to 3. In an embodiment, k and l are each independently selected such that k+l equals 4. In one non-limiting example, $R^1$ is —$SO_2$—$(CH_2)_3$—$SO_3Z$, $R^2$ is —$SO_2$—$(CH_2)_3$—$SO_2NH$—$CH_2CH(OH)CH_3$, k is 3, and Z is lithium.

The cyan ink may also include additional dyes or colorants. In one embodiment, the cyan ink further includes at least one additional dye, such as Direct Blue 199 (DB199), Direct Blue 86 (DB86), Direct Blue 87 (DB87), Direct Blue 307 (DB307), or Acid Blue 9 (AB9). In another embodiment, the cyan ink includes AB9, or the sodium or lithium salt of AB9. The AB9 may be added to the cyan ink in an amount ranging from about 0.01 to about 1 wt %, from about 0.05 to about 0.5 wt %, or from about 0.07 to about 0.4 wt %.

Table 1 below provides non-limiting examples of phthalocyanine dyes having Structure 5 in which the substituents $R^1$ and $R^2$ are each introduced at the R-position. It is to be understood that although one dye has the R substituent at the R-position, the dye, and the ink containing the same, may further include the same basic nucleus with the R substituent at different positions, such as at the α-position. In the exemplary dyes shown in Table 1, M of Structure 5 is copper (Cu).

TABLE 1

| Cyan Dye | $R_1$ | K | $R_2$ | I |
|---|---|---|---|---|
| C1 | —SO—$(CH_2)_3$—$SO_3K$ | 3 | —$SO_2$—$(CH_2)_3$—$SO_2NH$—$C_2H_4OC_2H_4OH$ | 1 |
| C2 | —$SO_2$—$(CH_2)_3$—$SO_3K$ | 2 | —$SO_2$—$(CH_2)_3$—$SO_2NH$—$C_2H_4OC_2H_4OH$ | 2 |
| C3 | —$SO_2$—$(CH_2)_3$—$SO_3Li$ | 3 | —$SO_2$—$(CH_2)_3$—$SO_2NH$—$CH_2CH(OH)CH_3$ | 1 |
| C4 | —$SO_2$—$(CH_2)_3$—$SO_3Li$ | 2.7 | —$SO_2$—$(CH_2)_3$—$SO_2NH$—$CH_2CH(OH)CH_3$ | 1.3 |
| C5 | —$SO_2$—$(CH_2)_3$—$SO_3Li$ | 2 | —$SO_2$—$(CH_2)_3$—$SO_2NH$—$CH_2CH(OH)CH_3$ | 2 |

In another non-limiting example, the pretreatment fluid is configured to optimize the performance of a subsequent ink containing yellow colorant. The yellow colorant may be an azo yellow dye having the following structure:

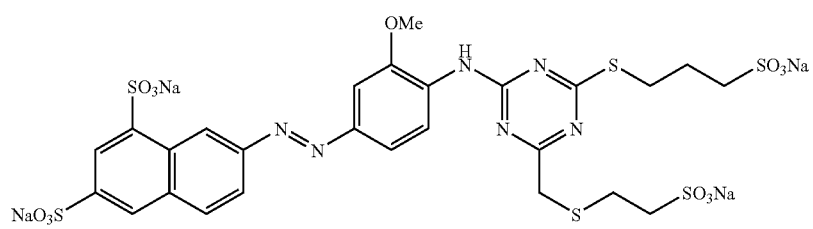

(6)

In still another example, the pretreatment fluid is configured to optimize the performance of a subsequent ink containing black colorant. In some embodiments, black dye is used as the colorant.

In other embodiments, black pigment is used as the colorant. The black pigment may be a self-dispersed pigment. Self-dispersed pigment particles are surface-treated or chemically modified with functional groups so as to render the pigment particles dispersible in the liquid vehicle. Examples of water-dispersible black pigments suitable for use herein are made from commercially available pigments obtained from colorant vendors, such as Cabot Corp. It is to be understood that many base black pigments may be used in the pretreatment fluid and subsequent ink, and that the following pigments are non-limiting examples of such pigments: those available from Cabot include MONARCH® 1400, MONARCH® 1300, MONARCH® 1100, MONARCH® 1000, MONARCH® 900, MONARCH® 880, and MONARCH® 700, CAB-O-JET® 200 and CAB-O-JET® 300; those available from Columbian include RAVEN® 7000, RAVEN® 5750, RAVEN® 5250, RAVEN® 5000, and RAVEN® 3500; and those available from Degussa include Color Black FW 200, Color Black FW 2V, Color Black FW1, Color Black FW 18, Color Black FW S160, Color Black FW S170, Special Black 6, Special Black 5, Special Black 4A, Special Black 4, PRINTEX® U, PRINTEX® 140U, PRINTEX® V, and PRINTEX® 140V. In the above list, CAB-O-JET® 200 and CAB-O-JET® 300 represent self-dispersed pigments with surface ionic groups attached. It is to be understood that all of the above pigments may use different chemical modifiers.

Any other suitable dyes and/or pigments may be employed in embodiments of the pretreatment fluids, and/or in the subsequent fluid (e.g., ink) that contacts the pretreated surfaces.

It is believed that pretreatment fluids containing pigments and/or dyes are particularly suitable for on pen production line nozzle firing checks that are performed prior to filling or exposing the fluidic component with or to an ink composition.

As previously stated, the fluorinated surfactants (i.e., ionic fluorinated surfactant(s), non-ionic fluorinated surfactant(s), or combinations thereof) are present in the pretreatment fluid in an effective amount. Without being bound to any theory, it is believed that the surfactants advantageously interact in a manner that allows them to migrate, align, and adsorb to at least a portion of the surface(s) to which the pretreatment fluid is exposed. It is further believed that the polarity of the surfactant(s) used, the amount in which the surfactant(s) is/are present, and the exposure time of the fluid to the surface(s) contribute, at least in part, to the advantageous alignment of the surfactant(s) on the surface(s) of the fluidic components (e.g., pen or other fluid ejection device components).

The ionic fluorinated surfactants are generally anionic, while the non-ionic fluorinated surfactants are non-ionic. Suitable fluorinated surfactants include but are not limited to fluorocarbon surfactants, such as those formed at least in part from a polymer having the following structure:

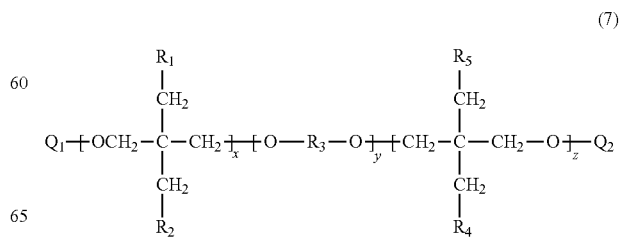

(7)

In an embodiment, $Q_1$ and $Q_2$ of Structure (7) are independently selected from H, $SO_3^-W^+$, $COO^-W^+$, and COOH, where W is selected from the $NH_4^+$, $Li^+$, $Na^+$, and $K^+$. $R_2$ and $R_4$ are independently selected from H and OH; $R_1$, and $R_5$ are independently selected from $O(CH_2)_m$—$(CF_2)_n$—$CF_3$, where m=1 to 3 and n=0 to 3; and $R_3$ is selected from $(CH_2)_L$ and the following:

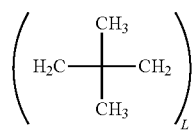

(8)

wherein L=1 to 4. In the fluorocarbon surfactant (Structure 7), x=1 to 10, y=1 to 30, and z=1 to 10. In one embodiment, the fluorocarbon surfactant (Structure 7) is formed from at least a polymeric material having L=4, m=1, n=1, $R_2$=H and $R_4$=H.

It is to be understood that the fluorocarbon surfactant (Structure (7)) may be made ionic or non-ionic. An anionic fluorocarbon surfactant may include at least one $CF_3$ group, while a non-ionic fluorocarbon surfactant may include at least one $C_2F_5$ group. Examples of suitable fluorocarbon surfactants include, but are not limited to those that are commercially available under the tradename of POLYFOX® fluorocarbon surfactants from Omnova Solutions, Inc. (Fairlawn, Ohio). Example anionic POLYFOX® surfactants include, but are not limited to POLYFOX® PF-136A (see Structure (9), below) and POLYFOX® PF-156A.

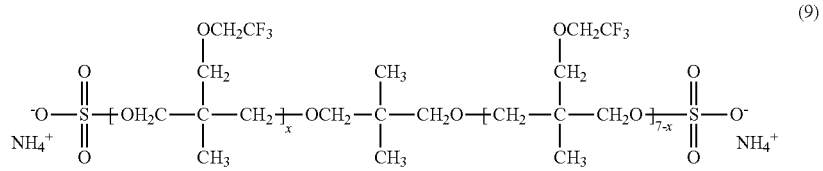

(9)

Example non-ionic POLYFOX® surfactants include, but are not limited to POLYFOX® PF-151N (see Structure (10), below), POLYFOX® PF-154N, and POLYFOX® PF-159.

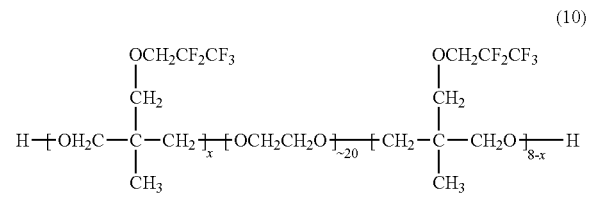

(10)

In an embodiment, the total amount of fluorinated surfactant(s) present in the pretreatment fluid ranges from about 0.0002 wt % to about 20 wt %. The weight percent represents the surfactant as is weight per 100 g pretreatment fluid. As a non-limiting example, the amount of non-ionic surfactant present ranges from about 0.0005 wt % to about 19.9995 wt %, and/or the amount of ionic surfactant present ranges from about 0.0005 wt % to about 19.9995 wt %.

In embodiments of the pretreatment fluid containing both ionic and non-ionic fluorinated surfactants, the weight ratio of ionic to non-ionic surfactant ranges from about 1:200 to about 200:1, from about 1:50 to about 50:1, or from about 1:20 to about 20:1.

It is to be understood that the upper limit of the total amount of fluorinated surfactant(s) in the pretreatment fluid may be increased as desired. Generally, surfactant levels higher than 20 wt % will not deleteriously affect subsequent ink decap performance, as long as the pretreatment fluid is sufficiently expelled, flushed, and/or replaced with air or another fluid. When using embodiments of the pretreatment fluid having increased amounts of fluorinated surfactants, the exposure time of surfaces to such pretreatment fluid(s) may be decreased to compensate for the high concentrations of fluorinated surfactants, and/or the pretreatment fluid(s) may be expelled, flushed, or replaced with air or other fluid to optimize the pretreatment effects on subsequent fluids.

Furthermore, as previously indicated, the effective amount of fluorinated surfactant (ionic, non-ionic or combinations thereof) in the pretreatment fluid depends, at least in part, on the nature of the system and surfaces to be treated, the chemical composition, physical behavior, jettability, and performance of inks used in the system, the system pretreatment time, the pretreatment components, and/or combinations thereof. As such, the effective amount may vary as desired for a particular system and/or result.

A method of using the pretreatment fluid disclosed herein includes depositing the pretreatment fluid on the surface of or in one or more fluidic components of a fluid ejection device (e.g., thermal inkjet printers, piezoelectric inkjet printers, etc.). Embodiments of the pretreatment fluid may be injected or otherwise brought into direct contact with selected surfaces or all surfaces that subsequent fluids (e.g., ink) will contact. As non-limiting examples, the pretreatment fluid may be deposited on an orifice plate exterior surface, on orifice interior surfaces and edges, in bores or firing chambers, on resistor surfaces, inside ink feed channels, on surfaces of PTA features or shelves, on slot or plenum surfaces, on filters, screens, IDS, and/or any other component that contains or contacts other fluids (e.g., ink), and/or combinations thereof.

The amount of pretreatment fluid added to the component depends, at least in part, on how much of the surface is to be treated. In one embodiment, the fluidic component may be filled with pretreatment fluid if it is desirable to treat the entire interior surface. In another embodiment, the fluidic component may be filled with pretreatment fluid to any other volume that is less than 100%. In still another embodiment, the pretreatment fluid may be wiped or otherwise deposited over any desirable fluidic component exterior surface (e.g., exterior surface of orifice plate).

It may also be desirable to use two or more different embodiments of the pretreatment fluid to pre-treat fluidic components. This may be useful when the desired pre-treatment requires the use of relatively non-compatible components. As a non-limiting example, a first pretreatment fluid may include a non-water-soluble fluorinated surfactant(s)

and an organic solvent (without water in the vehicle), and a second pretreatment fluid may contain a water-soluble fluorosurfactant(s) and water (with or without other co-solvents in the vehicle). As such, the pretreatment fluid or fluids used depends, at least in part, on the desirable effects for the subsequent fluid performance, and on the compatibility (e.g., lack of compatible solubility, or reactivity, etc.), of the pretreatment fluid components that are desired to treat the surfaces.

The pretreatment fluid is allowed to contact at least a portion of the surface of the fluidic component(s) for a predetermined time. The predetermined time is generally related to the total amount and/or ratio of the fluorinated surfactant(s) and amount and/or ratio of other surface active components present in the pretreatment fluid. It is to be understood that when a higher amount of the surfactant(s) is present in the pretreatment fluid, the less time it takes for the surfactants to interact and adhere to the surface. Following this logic, when the amount of surfactant(s) present in the pretreatment fluid is lower, the exposure time may be longer for adherence to occur. As such, the predetermined time may vary with each pretreatment fluid that is formulated.

As a non-limiting example, if the pretreatment fluid contains surfactant(s) in an amount closer to the 20 wt % end of the range, pretreatment fluid exposure time is relatively short (e.g., 1 second or less) prior to partially or fully expelling, flushing, or replacing the pretreatment fluid with air or another fluid (e.g., water, inkjet ink, etc). As another non-limiting example, if the pretreatment fluid contains surfactant(s) in an amount closer to the 0.0002 wt % end of the range, pretreatment fluid exposure time is relatively long (e.g., one month or more) prior to partially or fully expelling, flushing, or replacing the pretreatment fluid with air or another fluid (e.g., water, inkjet ink, etc.).

As discussed hereinabove, the effective amount of surfactant(s) and the exposure time may also vary depending on the system being treated, and the inks that are used in such systems. In one example embodiment, a system that is shipped and distributed with an embodiment of the pretreatment fluid in or on fluidic components may have a relatively low level of fluorinated surfactant. This may be due, at least in part, to the fact that pretreatment exposure time is relatively long (e.g., days, weeks, or months), and that the pretreatment fluid may be mixed with subsequently incorporated ink. In another example embodiment, a system having the pretreatment fluid introduced and expelled (e.g., with air, water, etc.) during manufacturing may have a relatively high level of fluorinated surfactant. This may be due, at least in part, to the fact the pretreatment exposure time is relatively short (e.g., seconds or minutes), and that the level of pretreatment fluid exposed to subsequently incorporated ink is relatively low.

After exposure, the pretreatment fluid is flushed from the fluidic component(s). In an embodiment, the fluid ejection device ejects the pretreatment fluid in a manner similar to how it ejects other fluids (e.g., pretreatment fluid is mixed with ink and expelled from the device). In another embodiment, air and/or water is used to eject the pretreatment fluid from the component. In still another embodiment, the pretreatment fluid is flushed from the component by introduction of a second fluid (e.g., a shipping and handling fluid, a non-limiting example of which is described in co-pending application entitled "Shipping, Handling, and Testing Fluids for Ink Dispensing Systems" to Zia Ur Rehman and John R. Moffatt, filed on Apr. 30, 2007 U.S. Patent Application No. 2008/0265211, which is incorporated herein by reference in its entirety), which is then followed by the introduction of the subsequent fluid, for which the pretreatment fluid is configured to enhance the performance.

As briefly described hereinabove, it is to be understood that the pretreatment fluid may be flushed out before or after the fluid ejection device is shipped (e.g., to a retailer that will sell the device, to a consumer who will use the device, etc.). It is to be further understood that the pretreatment fluid may remain in or on the fluidic components until use of the device. In this embodiment, a user flushes the pretreatment fluid using, for example, ink that is loaded into the device.

Another embodiment of the method of using the pretreatment fluid includes depositing the pretreatment fluid on the surface of or in one or more fluidic components of a fluid ejection device after usage of the device for printing (e.g., determined by period of printing time, volume of ink used, appearance of printing defects, onset of reliability issues, or the like, or combinations thereof), and prior to continued usage of the device for additional printing. Without being bound to any theory, it is believed that this enables cleaning and rejuvenation treatment of surfaces with pretreatment fluid to restore desirable reliability and printing behavior for subsequently introduced fluids. It is also believed that this advantageously extends printhead lifetime.

In this embodiment of the method, the pretreatment fluid may be injected or otherwise brought into direct contact with selected surfaces or all surfaces that subsequent fluids (e.g., ink) will contact, as previously described. As non-limiting examples, the pretreatment fluid used for cleaning and rejuvenation of fluid ejection devices may be deposited on any of the fluidic components described herein. One other method for injecting the pretreatment fluid includes temporarily replacing a selected ink cartridge with a similar cartridge that contains pretreatment fluid. This is followed by priming and appropriate exposure time of the fluidic component(s) to the pretreatment fluid. After exposure, the pretreatment fluid may then be flushed from the fluidic component(s). Any of the previously described techniques for flushing the pretreatment fluid from the fluid ejection device may be used.

Embodiments of the fluid ejection device disclosed herein generally include a fluid supply fluidly and operatively connected to a fluid ejection component and/or to other fluidic components. Fluid ejection devices that are pretreated with the pretreatment fluid disclosed herein have ionic and/or non-ionic fluorinated surfactants migrating and adsorbing to at least a portion of the fluid ejection component and/or the other fluidic components. In one embodiment, the pretreatment fluid is present in the fluid ejection component and/or fluidic components and the surfactants are part of the pretreatment fluid. In another embodiment, the pretreatment fluid has been flushed from the fluid ejection device, and the surfactant(s) are adhered to the surface of the fluid ejection component and/or fluidic component(s) that have been exposed to the pretreatment fluid.

Without being bound to any theory, it is believed that embodiments of the pretreatment fluid, when used as a surface-preconditioning agent for one or more fluidic components, may enhance the performance of inks subsequently printed from such pretreated fluidic components. It is further believed that the pretreatment fluid may enhance the performance of any suitable ink, including pigment-based inks, dye-based inks, and/or combinations of pigment and dye based inks.

In one example embodiment, the inkjet ink advantageously affected by the pretreatment fluid includes one or more of the magenta dyes shown as Structures 3 and 4 above. One embodiment of the pretreatment fluid that may be suitable for enhancing printing performance of such magenta inks includes from about 0.1 wt % to about 0.5 wt % of fluorinated surfactant, and is allowed to pre-treat an inkjet pen for about 1 hour. Another embodiment of the pretreatment fluid that may be suitable for enhancing printing performance of such magenta inks includes about 0.1 wt % SURFYNOL® 465, about 0.3 wt % POLYFOX® 136A, and about 0.1 wt % POLYFOX® 151N. Still another embodiment of the pretreatment fluid that may be suitable for enhancing printing performance of such magenta inks includes about 0.2 wt % POLYFOX® 136A, and about 0.01 wt % POLYFOX® 151N.

It is believed that the pretreatment fluid disclosed herein may advantageously enhance printing performance (e.g., improved orifice plate wetting, ease of priming, nozzle startup, accurate ink drop trajectory, ink drop tailing, drop weight variation, ink starvation/trapped air in pen interiors during printing, consistent nozzle firing at different firing frequencies, improved printing system reliability, robustness to nozzle clogging, environmental conditions, loss of prime, etc.). As a result, the printed text quality and printed image quality and consistency (e.g., edge raggedness, banding, graininess, chroma, dot placement, dot grain, and/or the like) may also be enhanced.

Since at least some of the components of embodiments of the pretreatment fluid disclosed herein are interactive, a variety of compositions may advantageously be formulated. It is believed that the pretreatment fluid may be configured for a desirable system and/or ink by basing the effective amount of the fluorinated surfactant present in the pretreatment fluid on, at least in part, the system in which the pretreatment fluid is used, the ink composition that is used in the system, the system pretreatment time, the pretreatment fluid vehicle components, and/or combinations thereof.

Embodiments of the pretreatment fluid may also be formulated to contain additional components that pretreat surfaces in a manner that substantially prevents or mitigates deleterious effects potentially resulting from fluids subsequently contacting such surfaces (e.g., anti-corrosive agents to prevent corrosion of surfaces, anti-kogation agents to prevent damage to resistor surfaces, anti-flocculants to prevent nozzle clogging and nozzle starvation, etc.). Still other embodiments of the pretreatment fluid may be formulated to contain additional components that pretreat surfaces in a manner that substantially prevents or mitigates deleterious effects potentially resulting from the transfer of materials from surfaces to fluids subsequently contacting such surfaces (e.g., chelating agents (or sequestering agents) that substantially eliminate deleterious effects of heavy metal impurities and divalent cations (e.g., $Ca^{2+}$, $Mg^{2+}$, etc.)).

As a non-limiting example of this embodiment, the subsequent fluid may be a black pigment inkjet ink (containing self-dispersed black pigment from Cabot, described above) which tends to aggregate in the presence of $Ca^{2+}$ and $Mg^{2+}$. Such pigment aggregates may form inside ink channels, nozzles, etc., thereby potentially blocking ink flow, damaging print quality and pen reliability, and shortening printhead lifetime. In this example, from about 0.5 wt % to about 10 wt % EDTA may be added to the pretreatment fluid to extract $Ca^{2+}$ and $Mg^{2+}$ present in pen materials and adhesives. The pretreatment fluid may be flushed and replaced with subsequent inkjet ink containing black self-dispersed pigment. It is believed that, in this example, the pretreatment fluid improves print quality, pen reliability, and extends printhead lifetime.

While several embodiments have been described in detail, it will be apparent to those skilled in the art that the disclosed embodiments may be modified. Therefore, the foregoing description is to be considered exemplary rather than limiting.

What is claimed is:

1. A pretreatment fluid, consisting essentially of:
an effective amount of a fluorinated surfactant selected from at least one non-ionic fluorinated surfactant, at least one ionic fluorinated surfactant, and combinations thereof, the fluorinated surfactant being selected from

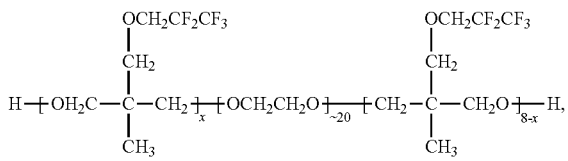

and

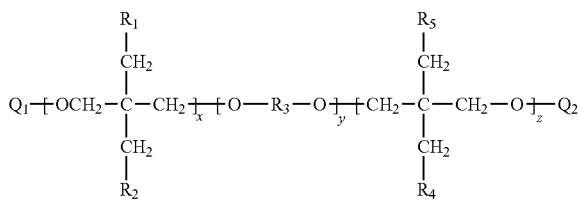

wherein $Q_1$ and $Q_2$ are independently selected from H and $SO_3^-W^+$, wherein W is selected from $NH_4^+$, $Li^+$, $Na^+$, and $K^+$, wherein $R_2$ and $R_4$ are independently selected from H and OH, wherein $R_1$, and $R_5$ are each $O(CH_2)_m$—$(CF_2)_n$—$CF_3$, wherein m ranges from 1 to 3 and n ranges from 0 to 3, wherein $R_3$ is

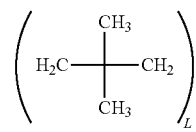

wherein L ranges from 1 to 4, and wherein x ranges from 1 to 10, y ranges from 1 to 30, and z ranges from 1 to 10;
a vehicle; and;
optionally at least one non-fluorinated surfactant; and
optionally ethylene-diamine-tetra-acetic acid (EDTA);
wherein the effective amount is selected based upon: a system in which the pretreatment fluid is used, an ink composition used in the system, system pretreatment time, pretreatment vehicle components, or combinations thereof, and wherein the effective amount of the fluorinated surfactant includes the at least one non-ionic fluorinated surfactant and the at least one ionic fluorinated surfactant present in a weight ratio ranging from about 1:200 to about 200:1.

2. The pretreatment fluid as defined in claim 1 wherein the at least one ionic surfactant is a fluorocarbon surfactant having the following structure:

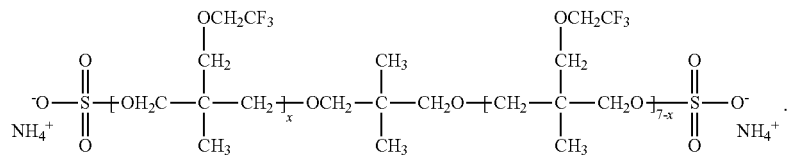

3. The pretreatment fluid as defined in claim 1 wherein the effective amount of fluorinated surfactant ranges from about 0.0002 wt % to about 20 wt %, wherein wt % is based on a total weight of the pretreatment fluid.

4. The pretreatment fluid as defined in claim 1 wherein the vehicle is selected from water, water-soluble organic solvents, organic solvents, and combinations thereof.

5. The pretreatment fluid as defined in claim 1, wherein the at least one non-fluorinated surfactant is present in the pretreatment fluid.

6. The pretreatment fluid as defined in claim 5 wherein the at least one non-fluorinated surfactant is selected from hydrophilic-hydrophobic modified acetylenic diol non-fluorinated surfactants having the following structure:

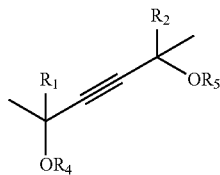

wherein $R_1$ and $R_2$ are branched alkyl groups, and $R_4$ and $R_5$ are modified hydrophilic-hydrophobic groups, or H.

7. The pretreatment fluid as defined in claim 1 wherein the vehicle is selected from solvents, co-solvents, humectants, organic solutes, inorganic solutes, preservatives, buffers, salts, acids, bases, biocides, anti-kogation additives, anti-corrosive additives, polymers, preservatives, chelating agents, sequestering agents, 4-morpholine ethane sulfonic acid, 4-morpholinepropanesulfonic acid, beta-hydroxy-4-morpholinepropane-sulfonic acid, viscosity modifiers, anti-flocculants, and combinations thereof.

8. The pretreatment fluid as defined in claim 1 wherein the ethylene-diamine-tetra-acetic acid is present in the pretreatment fluid in an amount ranging from about 0.5 wt % to about 10 wt %.

9. The pretreatment fluid as defined in claim 1 wherein the ionic fluorinated surfactant is present in an amount of about 0.2 wt %, wherein the ionic fluorinated surfactant is:

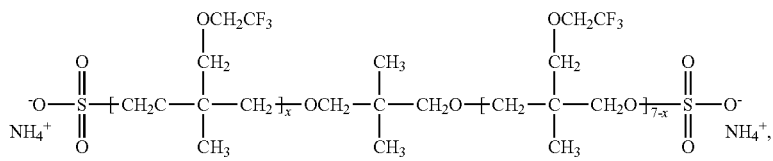

and wherein the non-ionic fluorinated surfactant is present in an amount of about 0.01 wt %, wherein the non-ionic fluorinated surfactant is:

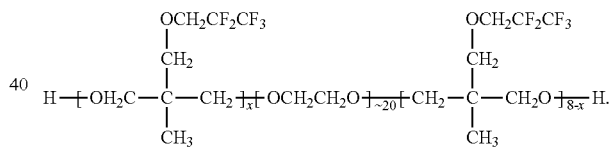

10. The pretreatment fluid as defined in claim 6 wherein the ionic fluorinated surfactant is present in an amount of about 0.3 wt %, wherein the ionic fluorinated surfactant is:

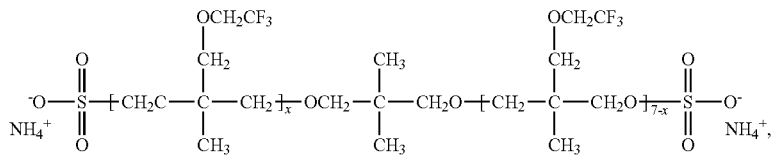

and wherein the non-ionic fluorinated surfactant is present in an amount of about 0.1 wt %, wherein the non-ionic fluorinated surfactant is:

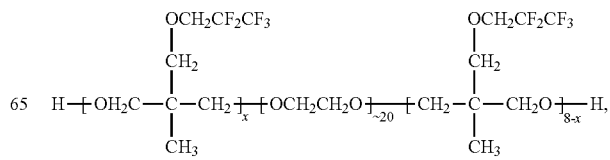

and
wherein the hydrophilic-hydrophobic modified acetylenic diol non-fluorinated surfactant
is present in the amount of about 0.1 wt %.

11. The pretreatment fluid as defined in claim 1 wherein the effective amount of fluorinated surfactant is configured to i) substantially migrate and adsorb to one or more surfaces of a fluid ejection device, ii) substantially enhance performance of an inkjet ink, iii) substantially enhance at least one of stability, reliability, or print quality of an inkjet ink when printed on a medium, iv) substantially reduce deleterious effects resulting from interaction between a surface and an inkjet ink, or v) combinations of i, ii, iii, and iv.

12. A method of using the pretreatment fluid of claim 1, the method comprising:
    introducing the pretreatment fluid in or on at least one fluidic component; and
    allowing the pretreatment fluid to contact at least a portion of the at least one fluidic component for a predetermined time.

13. The method as defined in claim 12, further comprising removing the pretreatment fluid from the at least one fluidic component.

14. The method as defined in claim 13, further comprising shipping a fluid ejection device prior to removing the pretreatment fluid or after removing the pretreatment fluid.

15. The method as defined in claim 12 wherein the fluidic component is part of an inkjet printer, and wherein the method further comprises depositing an ink into or on the at least one fluidic component after the pretreatment fluid is removed therefrom.

16. The method as defined in claim 15 wherein the ink includes a colorant selected from pigments, dyes, and combinations thereof.

17. The method as defined in claim 15 wherein the ink includes a magenta dye selected from formula 1, formula 2, and combinations thereof:

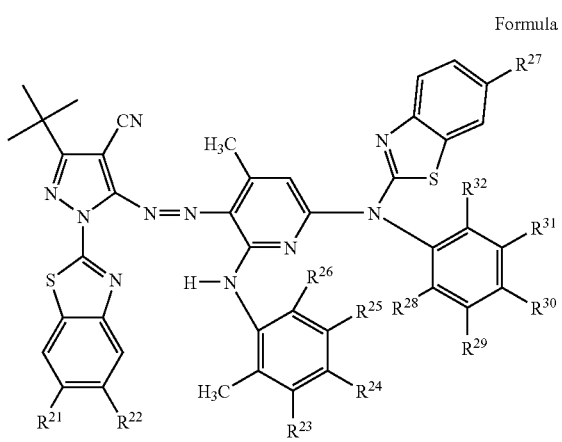

Formula 1

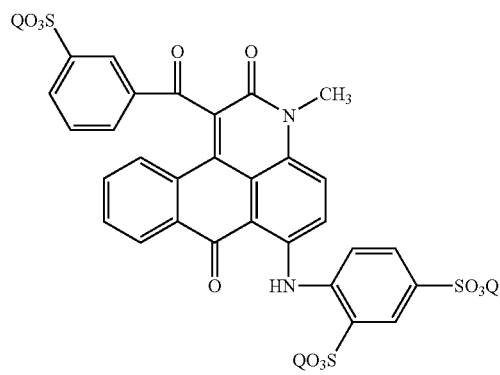

Formula 2 wherein in formula 1: $R^{21}$, $R^{23}$, $R^{25}$, $R^{27}$, $R^{29}$, and $R^{31}$ are independently selected from a hydrogen atom and a sulfonate group, $R^{22}$ is a hydrogen atom or a nitro group, $R^{26}$ and $R^{28}$ are independently selected from a hydrogen atom and a methyl group, $R^{24}$ and $R^{30}$ are independently selected from a methyl group and a sulfonate group, and $R^{32}$ is selected from a methyl group and a methoxy group; and wherein in formula 2: Q is selected from lithium, potassium, sodium, ammonium, tetramethylammonium, salts thereof, and combinations thereof.

18. A method of making a pretreatment fluid as defined in claim 1, the method comprising:
    determining an effective amount of the fluorinated surfactant based on a system in which the pretreatment fluid is used, an ink composition used in the system, system pretreatment time, pretreatment fluid vehicle components, or combinations thereof, wherein the fluorinated surfactant is the at least one ionic fluorinated surfactant and the at least one non-ionic fluorinated surfactant; and
    adding the effective amount of the fluorinated surfactant to a vehicle.

19. A pretreatment fluid, consisting essentially of:
    an effective amount of a fluorinated surfactant selected from at least one non-ionic fluorinated surfactant, at least one ionic fluorinated surfactant, and combinations thereof, the fluorinated surfactant being selected from

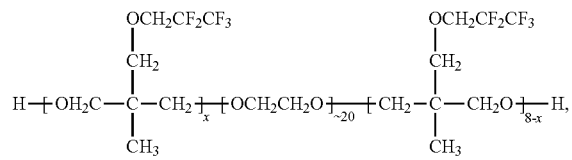

and

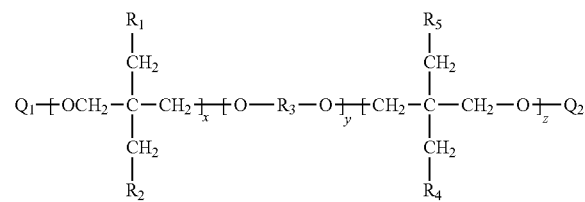

wherein $Q_1$ and $Q_2$ are independently selected from H and $SO_3^-W^+$, wherein W is selected from $NH_4^+$, $Li^+$, $Na^+$, and $K^+$, wherein $R_2$ and $R_4$ are independently selected from H and OH, wherein $R_1$, and $R_5$ are each $O(CH_2)_m-(CF_2)_n-CF_3$, wherein m ranges from 1 to 3 and n ranges from 0 to 3, wherein $R_3$ is

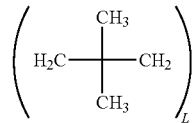

wherein L ranges from 1 to 4, and wherein x ranges from 1 to 10, y ranges from 1 to 30, and z ranges from 1 to 10, and wherein the effective amount of the fluorinated surfactant includes the at least one non-ionic fluorinated surfactant and the at least one ionic fluorinated surfactant present in a weight ratio ranging from about 1:200 to about 200:1; and a vehicle.

* * * * *